United States Patent
Damo

(10) Patent No.: US 9,010,040 B2
(45) Date of Patent: Apr. 21, 2015

(54) MODULAR PANEL FOR MAKING COVERING STRUCTURES FOR WALLS, COVERING STRUCTURES OR WALLS AND METHOD

(75) Inventor: Mario Damo, Motta di Livenza (IT)

(73) Assignee: MAS SRL, San Polo di Piave (IT)

( * ) Notice: Subject to any disclaimer, the term of this patent is extended or adjusted under 35 U.S.C. 154(b) by 138 days.

(21) Appl. No.: 13/380,932

(22) PCT Filed: Jun. 24, 2010

(86) PCT No.: PCT/IB2010/001529
§ 371 (c)(1),
(2), (4) Date: Dec. 27, 2011

(87) PCT Pub. No.: WO2010/150086
PCT Pub. Date: Dec. 29, 2010

(65) Prior Publication Data
US 2012/0102844 A1 May 3, 2012

(30) Foreign Application Priority Data
Jun. 26, 2009 (IT) .............................. UD2009A0124

(51) Int. Cl.
E04D 13/18 (2014.01)
F24J 2/04 (2006.01)
F24J 2/52 (2006.01)

(52) U.S. Cl.
CPC ................ *F24J 2/045* (2013.01); *F24J 2/0444* (2013.01); *F24J 2/5262* (2013.01); *Y02B 10/12* (2013.01); *Y02B 10/20* (2013.01); *Y02E 10/44* (2013.01); *Y02E 10/47* (2013.01)

(58) Field of Classification Search
USPC ......... 52/173.3; 126/621, 634, 639, 628, 629, 126/653, 678, 707, 711, 622, 623
See application file for complete search history.

(56) References Cited

U.S. PATENT DOCUMENTS

| | | | | |
|---|---|---|---|---|
| 3,918,430 A | * | 11/1975 | Stout et al. ..................... | 126/665 |
| 4,055,163 A | * | 10/1977 | Costello et al. ............... | 126/654 |
| 4,183,350 A | | 1/1980 | Staudacher | |
| 4,207,865 A | | 6/1980 | Allen | |
| 4,228,790 A | * | 10/1980 | Davison et al. ............... | 126/624 |
| 4,350,145 A | | 9/1982 | Bianchini | |
| 4,404,962 A | * | 9/1983 | Zinn et al. ..................... | 126/676 |
| 4,942,865 A | * | 7/1990 | Pierce-Bjorklund ......... | 126/633 |
| 7,712,542 B2 | * | 5/2010 | Munroe .......................... | 169/14 |

FOREIGN PATENT DOCUMENTS

| | | |
|---|---|---|
| DE | 39 38 596 A1 | 5/1991 |
| DE | 102 03 338 A1 | 7/2003 |
| EP | 0 455 184 A1 | 11/1991 |
| EP | 2 061 091 A1 | 5/2009 |
| FR | 2 754 840 A1 | 4/1998 |
| WO | WO 81/00445 | 2/1981 |
| WO | WO 2004/003309 A1 | 1/2004 |

OTHER PUBLICATIONS

Patent Cooperation Treaty (PCT) International Search Report and Written Opinion of the International Searching Authority, International Application No. PCT/IB2010/001529, Dated Dec. 23, 2010, 11 pages.

* cited by examiner

*Primary Examiner* — Jessica Laux
(74) *Attorney, Agent, or Firm* — Flaster/Greenberg P.C.

(57) ABSTRACT

A modular panel to make a roof or a wall of a building comprises an external shell and an internal shell, made of moldable plastic material, coupled with each other to define at least a compartment. The panel integrates in itself means for the capturing and irradiation of energy, and relative energy accumulation means, the capturing and irradiation means being associated, at least partly, with the external shell.

8 Claims, 4 Drawing Sheets

MODULAR PANEL FOR MAKING COVERING STRUCTURES FOR WALLS, COVERING STRUCTURES OR WALLS AND METHOD

BACKGROUND OF THE INVENTION

1. Field of the Invention

The present invention concerns a modular panel to make roofs, such as for example the roofs of buildings, or to make walls, such as for example the perimeter walls of such buildings.

In particular, the present invention is preferably applied in the building sector when it is desired to make a closed room or premises, insulated acoustically and/or thermally, possibly having anti-seismic characteristics, and/or inside which considerable consumption of electric and/or heat energy is expected, and it is desired at least partly to use clean and/or alternative and/or renewable energy.

2. Description of Related Art

It is known that the need to use alternative and/or renewable energy sources, to integrate traditional energy production sources, is commonly felt, in particular due to the increasingly greater attention given to reducing atmospheric pollution caused by using said traditional energy production sources, and also to render the exploitation thereof less intensive, since there is only a finite supply.

In this context, solutions are known which provide to install, on the roofs of building structures, additional structures such as, for example, solar or photovoltaic cells or panels, able to exploit the radiant energy of the sun so as to generate respectively thermal or electric energy.

By building structures, here and hereafter in the description, we mean houses, public buildings, car parks and more generally any closed building requiring filling and/or heating and/or conditioning and/or any form of thermo-acoustic insulation from the outside environment and/or requiring a production of thermal and/or photovoltaic energy, or more generally any form of alternative and/or renewable energy.

In known solutions, the roof of the building normally consists of covering elements, such as for example tiles, pantiles or panels, which need to be supported by support structures comprising, for example, beams and purlins. This has a negative effect on the times and costs of making the roofs, which are high, and also on the complexity of constructing the roof.

Another disadvantage of known solutions is the lack of connection elements between the covering elements of the roofs and/or the use of materials with poor capacity of absorbing elastic energy, which leads to poor anti-seismic characteristics, which must possibly be obtained with additional devices and structures.

Another disadvantage is that known panels, designed exclusively to recover and transform solar radiation into thermal or photovoltaic energy and integrating roofs, are extremely bulky, have a negative visual impact, low aesthetic level and adapt very poorly to building structures from an aesthetic point of view. Moreover, they cause a negative environmental impact that may prevent them being used in zones that are restricted by laws on environmental protection.

Another disadvantage is that, in the case of vault-type roofs, it is difficult to integrate additional structures to exploit radiant energy, since mounting such structures on curved surfaces is more complex, as it is necessary to guarantee at least the same stability they enjoy when mounted on flat surfaces.

Sound-absorbent and/or sound-insulating covering panels are also known for roofs or walls, which are positioned on suitably disposed supporting beams, but they have the disadvantage that they are complex to assemble.

One purpose of the present invention is to achieve structural panels for roofs and walls able to incorporate means to exploit alternative and/or renewable energy, at the same time obtaining a reduction in manufacturing times and costs, also facilitating the assembly thereof, reducing to a minimum the supporting elements or structures.

Another purpose of the present invention is to integrate into the panels, and consequently into the roofs, at least the functions of thermal solar energy and/or photovoltaic energy.

Another purpose of the present invention is to supply alternative and/or renewable energy without additional costs beyond those of the roofs themselves, exploiting scale economies.

Another purpose of the present invention is to achieve panels that constitute self-supporting structural construction elements for buildings, thus improving the anti-seismic characteristics of the structural stability of the roofs and walls obtained.

Another purpose of the present invention is to reduce to a minimum the complexity and impact of the systems intended for energy recovery, while still guaranteeing conditions of great efficiency.

Another purpose is to obtain an optimum visual and aesthetic effect.

The Applicant has devised, tested and embodied the present invention to overcome the shortcomings of the state of the art and to obtain these and other purposes and advantages.

BRIEF SUMMARY OF THE INVENTION

The present invention is set forth and characterized in the independent claims, while the dependent claims describe other characteristics of the invention or variants to the main inventive idea.

In accordance with the above purposes, a modular panel to make a roof or wall of a building according to the present invention comprises at least an external shell and an internal shell, defining together an internal volume. External or internal, here and hereafter, are referred to the position with respect to the building considered.

According to a first feature, the external shell and/or the internal shell are at least partly made of a moldable plastic material, advantageously polyurethane material.

According to another feature, at least one of the two shells, advantageously the external one, is at least partly made of a reinforced polyurethane material, advantageously with reinforcement fibers.

In another preferential embodiment, the external shell is at least partly covered by a covering sheet, for example, but not only, a thermoplastic sheet. The structure with shells made of plastic material, at least partly reinforced by fibers, confers on each modular panel structural self-supporting characteristics which are accentuated, as we shall see hereafter, thanks to the characteristic coupling of adjacent panels.

Advantageously, moreover, at least part of the external shell and/or the internal shell is made of expanded material, for example expanded polyurethane, to obtain a characteristic lightness, while still maintaining a certain structural rigidity.

In this case, one embodiment of the invention provides that one or both the shells has an internal core made of expanded polyurethane material and an external cover made of reinforced polyurethane.

According to a characteristic feature of the invention, each modular panel integrates in itself energy capturing means and relative energy accumulation means. The capturing means are preferably associated with the external shell, whereas conditioning means for the building are optionally associated with the internal shell. The energy accumulation means, according to the invention, are disposed preferentially in the volume defined between the external shell and the internal shell.

According to the present invention, the modular panel comprises, integrated inside it, a compartment to contain a fluid energy accumulation mean such as, for example, water or gas, directly or indirectly associated with said capturing means.

According to a variant of the present invention, during use the compartment contains at least a heat-carrying fluid.

According to one embodiment of the invention, the capturing means comprise at least a sheet of glass coupled with the external shell, which also contributes to confer structural rigidity on the panel.

According to another embodiment, the glass capturing means are associated with metal sheet elements, the at least partial function of which is to irradiate heat and/or transfer thermal energy from the capturing means to the accumulation means.

According to another variant of the present invention, the modular panel comprises, integrated therewith, at least a circuit for the circulation of said fluid, at least between one panel and the adjacent one/ones.

According to another variant of the present invention, the panel comprises at least fire detection sensors and release valves to extinguish fires.

According to another variant, during use the compartment is in an at least partial vacuum condition, to improve the thermal and acoustic insulation as well as to make the structure rigid.

According to another variant of the present invention, the modular panel comprises lateral attachment means to connect the panels to each other so as to define in their entirety a substantially self-supporting roof.

According to another variant of the present invention, each shell, external and internal, has a coupling profile with mating ridges, which substantially couple with each other.

According to another variant of the present invention, the panel comprises photovoltaic elements to produce electric energy, integrated inside it.

According to another variant, the panel integrates both elements for the production of thermal solar energy, and also elements for the production of electric energy by means of photovoltaic conversion. In this case, the solar energy which is transformed into electric energy with photovoltaic technology is a reduced part of the total energy. The remaining energy, which would be lost, is recovered by the heat-carrying fluid present in the panel and is transformed into thermal energy. In the case of technologies that operate jointly, the fluid laps the surface of the glass sheet with the photovoltaic deposits and recovers the thermal solar energy that otherwise would be dispersed, in this way allowing considerable recovery efficiency.

BRIEF DESCRIPTION OF THE SEVERAL VIEWS OF THE DRAWINGS

These and other characteristics of the present invention will become apparent from the following description of a preferential form of embodiment, given as a non-restrictive example with reference to the attached drawings wherein.

DETAILED DESCRIPTION OF THE INVENTION

Figure 1:
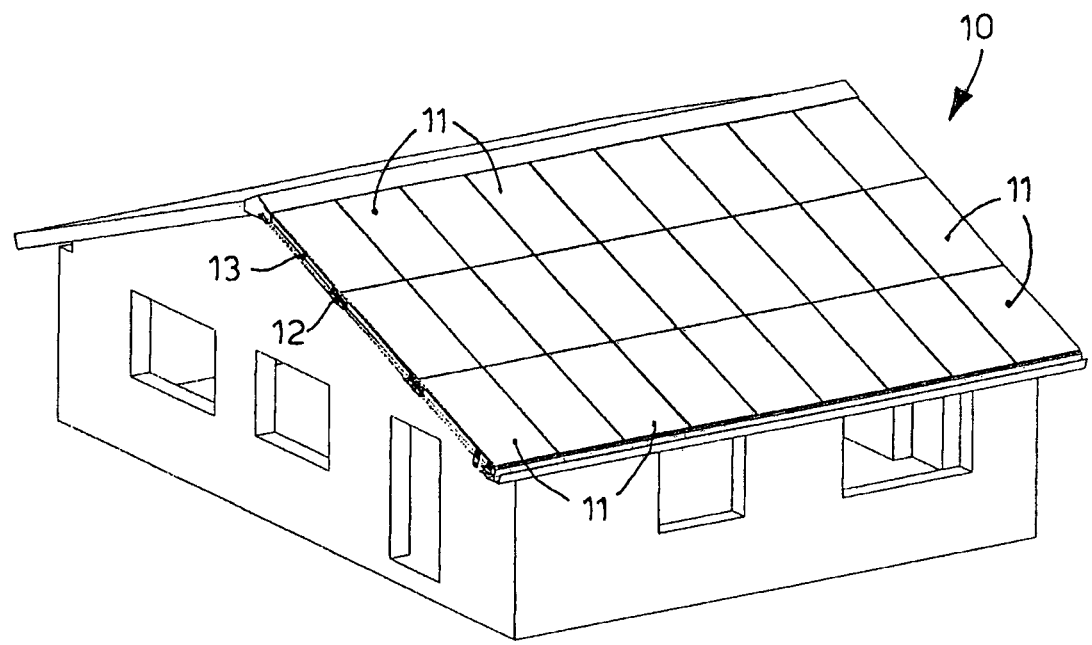
FIG. 1 is a three-dimensional view of a building with a sloping roof in which the roofs or walls obtained with the panel according to the invention can be applied.
Figure 2:
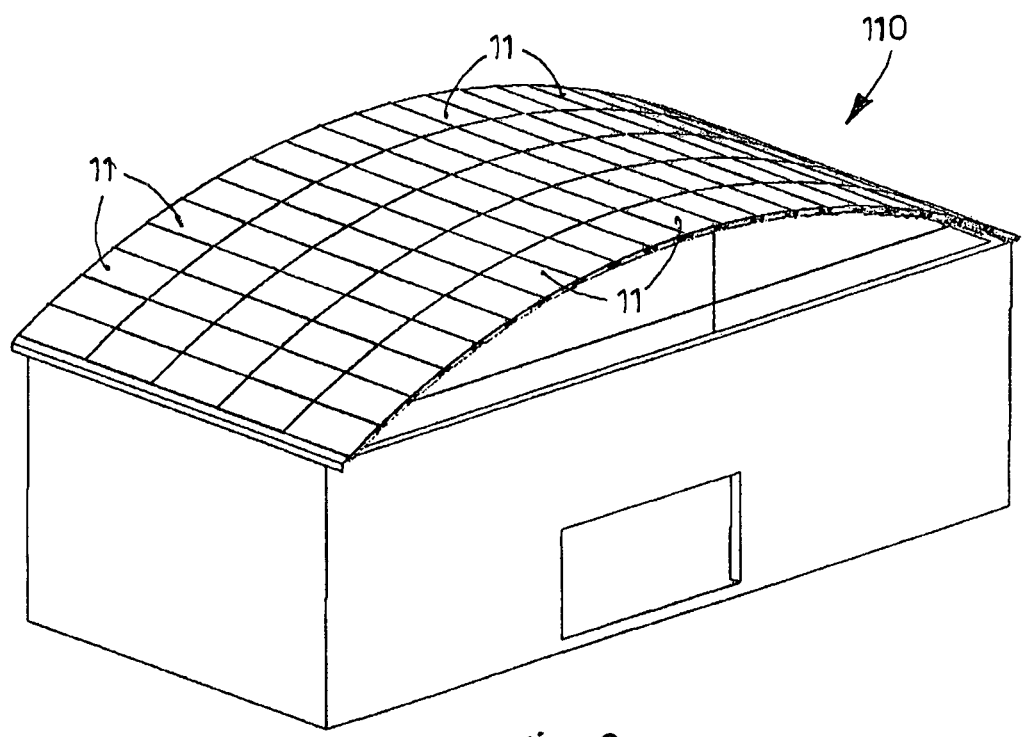
FIG. 2 is a three-dimensional view of a building with a vault-type roof.

With reference to FIG. 1, a complete sloping roof 10 according to the present invention of a building is shown. The building in this case is a residential building or a small industrial construction. The roof 10 is self-supporting and comprises a plurality of modular panels 11, in this case identical to each other, disposed adjacent to each other, coupled so as to define the entire roof surface 10. The panels 11 positioned more externally on said surface, along the external perimeter of the roof 10, are attached laterally to perimeter support elements 13, such as for example beams, by means of clamping elements 12 such as for example suitably insulated closing or filling elements. Apart from roofs for houses and small constructions, typically sloping, the modular panels 11 can be used to make roofs for buildings of a larger size, where often a self-supporting vault-type roof 110 is used, as shown in FIG. 2. Both roofs 10, 110, shown in FIGS. 1 and 2, comprise rectangular panels 11, but this does not exclude the possibility that the panels 11 can be made in any geometrical shape whatsoever.

Figure 3:
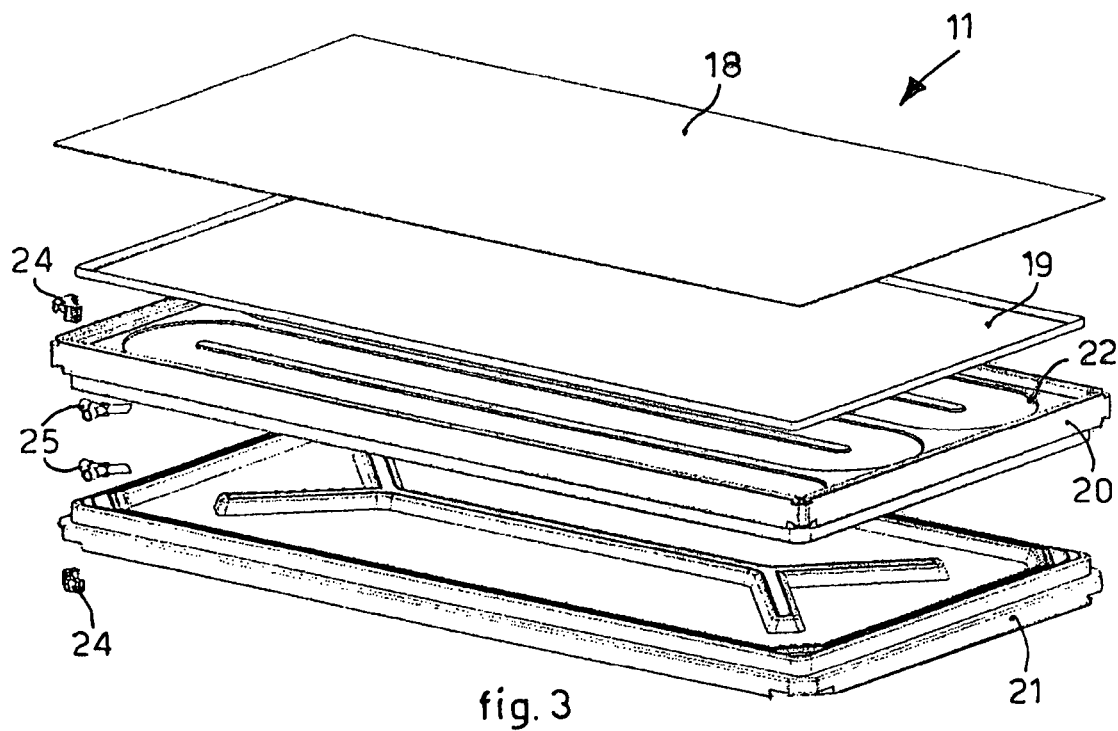
FIG. 3 is an exploded three-dimensional view of a possible form of embodiment of a modular panel according to the invention.

With reference to FIG. 3, a possible form of embodiment of a modular panel 11 to make a roof 10 or 110 or a wall according to the present invention consists of an internal shell 21 and an external shell 20, superimposed on each other, energy capturing means, for example thermal energy, and irradiation means; it also consists of two circuits, a capturing circuit 22, made from an external casing 45 made of thermoplastic film, and a conditioning circuit 26.

The internal shell 21 and the external shell 20 are made of a moldable plastic material, in particular polyurethane material or suchlike; the external shell 20 is advantageously at least partly of the type reinforced with fibers, for example glass or carbon fibers, and/or has reinforcement inserts at predetermined points. In this way the panel 11, after the internal shell 21 and external shell 20 have been coupled, assumes a structural rigidity that confers on it self-supporting characteristics, also in consideration of the possible presence of filling and/or completion elements as described hereafter.

Figure 7:
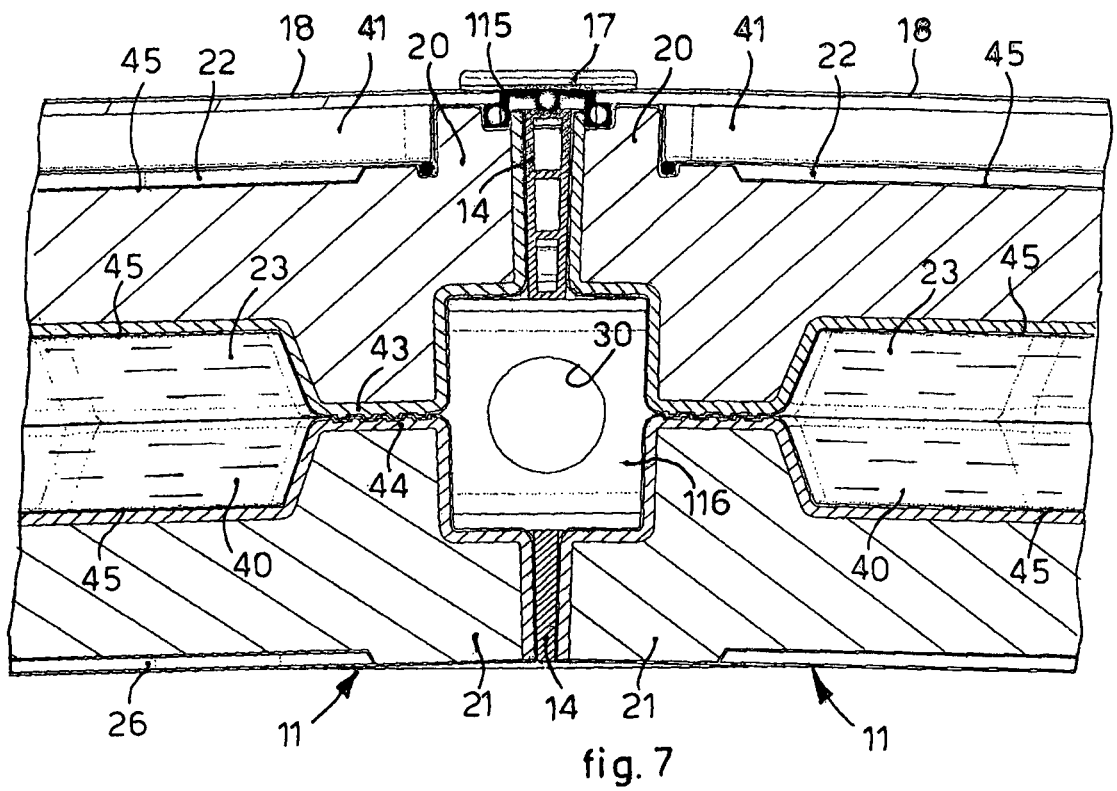
FIG. 7 is a front sectioned view of two modular panels connected to each other when they are used for a vault-type roof.
Figure 8:
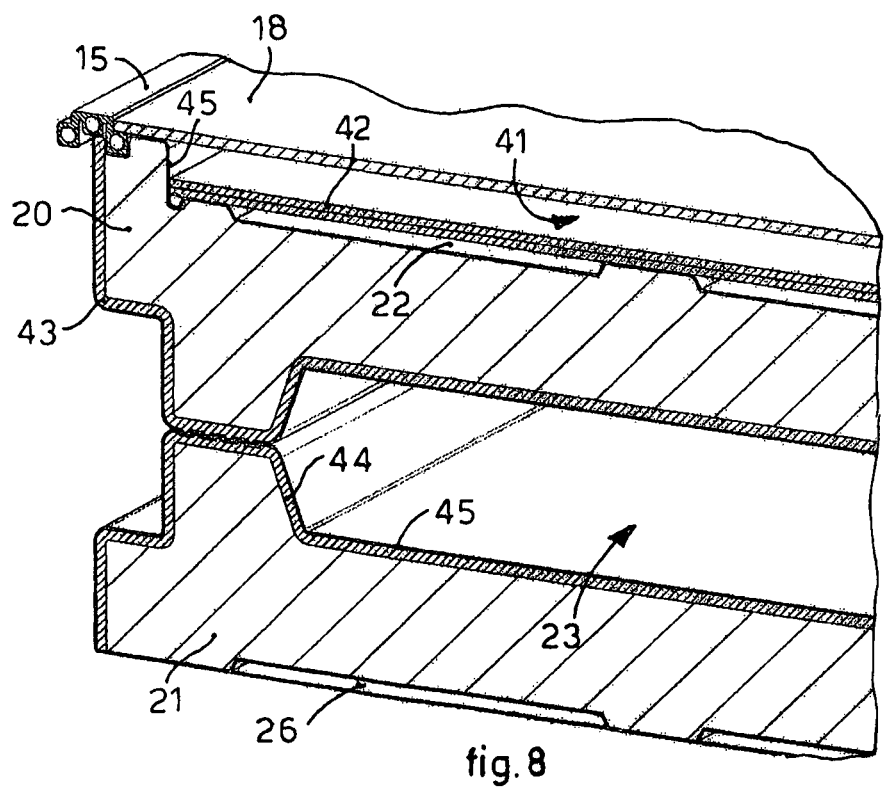
FIG. 8 is a front view, partly in section, of a modular panel integrating thermal solar energy and photovoltaic energy.

In the embodiments shown in FIGS. 7 and 8, the two shells, external 20 and internal 21, made of expanded polyurethane, are at least partly reinforced respectively by two thin layers, respectively 43 and 44, of binding material, suitably shaped, loaded with glass or carbon fibers or other, which guarantee the structural characteristics of the panel 11. The layers 43 and 44 also allow to integrate functional elements, such as for example the inserts 24, necessary as attachment elements to be used to assemble the structure. All these layers of the panel 11 are in any case made of insulating material, and guarantee good characteristics of heat and acoustic insulation.

The external casing 45, consisting of a thermoplastic film, is in this case at least partly present outside each shell, as shown in FIGS. 7 and 8, and is able to resist temperature and to give rigidity to the panel 11, further accentuating the self-supporting characteristics thereof.

The capturing and irradiation means consist in this case of a glass panel 18 and a capturing panel 19, for example sheet metal, between which there is a chamber 41 which can possibly accommodate a photovoltaic element. The photovoltaic element can be, for example instead of the panel 19, a glass panel 42 covered for example in amorphous silicon, as shown in FIG. 8. The glass panel 48 is at least partly in contact with an energy accumulation mean 40, or heat-carrying fluid, such as water for example, so as to promote the recovery of thermal energy that is dispersed in the conversion of thermal energy into electric energy with the photovoltaic effect. The glass panels 18, 42 and the metal sheet panel 19, added for capturing and irradiation, not only perform their own function but also allow to make the panel 11 rigid on the external sides, and therefore, thanks to the structure with the polyurethane shells as described above, the panel 11 becomes a bearing panel. The chamber 41 can alternatively be filled totally or partly with photovoltaic gel.

If the panel 11 according to the present invention is not used as a solar panel, it can have a flat shape covered by a ceramic sheet or aesthetic film instead of the circuit 22 made from the thermoplastic film 45.

The glass panel 18, facing outward, is permeable to solar radiations, which hit the capturing panel 19 made of metal sheet, in the case of thermal use, or the glass panel 42 in the case of double use, photovoltaic and thermal together. The infrared radiations in the chamber 41, to which the glass 18 is not permeable, cause a "greenhouse effect". The capturing panel 19, in the preferential embodiment, has a pigmented surface or covered for example with ceramic material, so as to capture the radiations and to transform them into heat to be transferred to the energy accumulation mean 40, which flows in the heat capturing circuit 22 made in the external shell 20. The circuit 22 consists of a coil circuit made from molding from the thermoplastic film 45, which is put in direct contact with the capturing panel 19 or the glass panel 42 in the case of photovoltaic use, and laps the walls thereof, so as to have the greatest possible energy transfer. The external shell 20, adjacent and constrained to the internal shell 21 by means of glue, screws 27 or other, together with the internal shell 21 creates a compartment 23, inside the panel 11, to accumulate the heat-carrying fluid mean 40.

The compartment 23 can also be put under depression, in order to increase the force of adhesion of the two shells 20 and 21, conferring better mechanical characteristics and at the same time increasing thermal and acoustic insulation.

Figure 4:
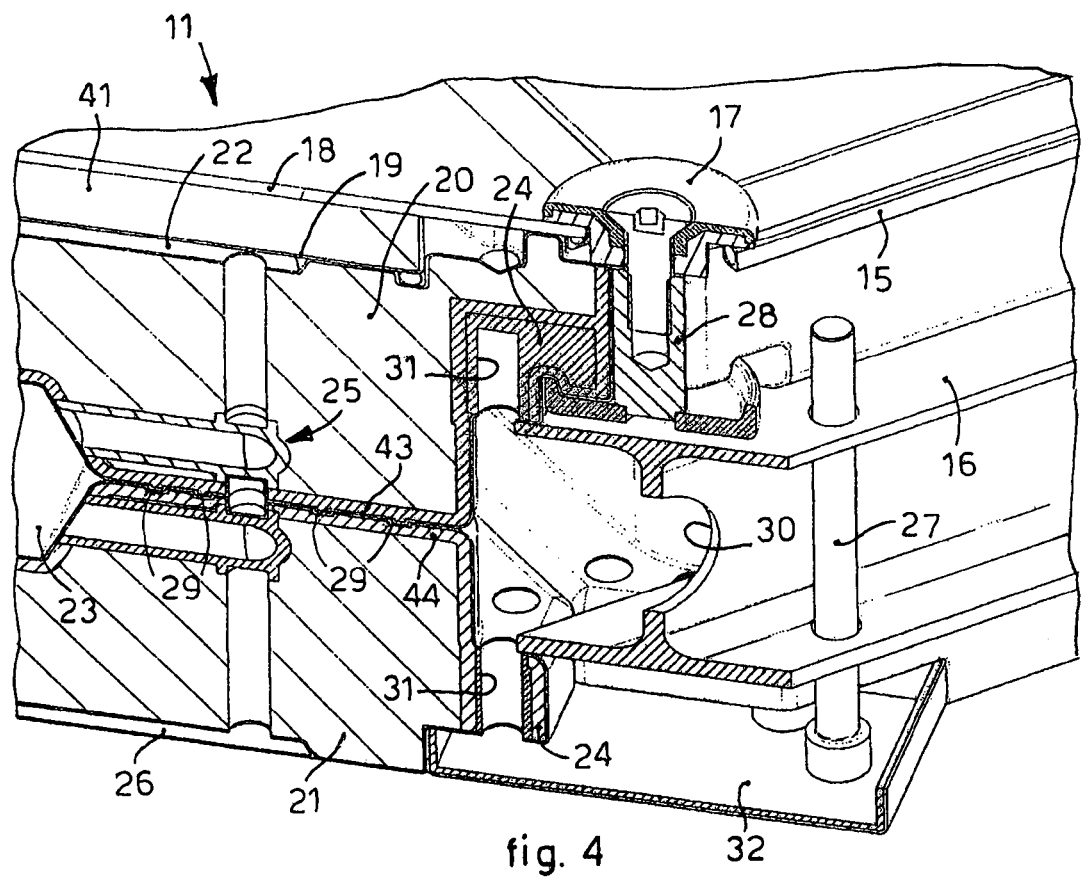
FIG. 4 is a sectioned three-dimensional view of a joining zone between four modular panels.

At the four corners of the shells 20 and 21, interconnection inserts 24 are mounted, and also inserts 25 to make channels and circuits along which the fluid 40 is made to flow. Each insert 24 has a hole 31, as shown in FIG. 4, to facilitate a possible passage of electric connections, if it is decided to install photovoltaic technology on the panels 11. This decision can also be taken at a later moment, because the cabling does not require the whole roof 10, 110 to be dis-assembled.

It is sufficient, in fact, to act on an internal closing element 32, positioned on the internal face of the panel 11 and hiding from view the screws 27 to access the internal spaces and to cable the appropriate electric circuits.

With regard to the fluidic connections, each insert 25 in this case comprises tubular branches communicating with each other, as shown in FIGS. 3 and 4, which perform different functions such as for example to take the fluid 40 toward the compartment 23, to connect the circuit of each panel 11 with the circuits of the adjacent panel 11s, to take the fluid 40 to the capturing circuit 22 or to the conditioning circuit 26.

The branches of the insert 25 can be open or plugged as desired, according to the requirements of the circuits 22 and 26.

On the perimeter of the panel 11 peripheral recesses are made, which allow to insert segments of connection section 16, 116 for the mutual connection of the modular panels 11, as shown in FIGS. 4 and 7. The connection section 16 or 116 in this case has a hole 30 to facilitate the passage of electric cables through the panels 11, if the panels 11 are of the photovoltaic type.

On the side of the panel 11 disposed toward the inside of the building there is in this case the circuit 26 for conditioning the rooms both in winter and in summer, shown in FIGS. 4, 7 and 8. In the circuit 26 the heat-carrying fluid circulating can be heated or cooled, respectively for winter and summer conditioning.

The different techniques which allow to obtain a cooling power starting from thermal energy are known in the state of the art, and are not repeated here. It is simply a question of providing the appropriate accessories and circuits.

When the rooms to be conditioned are not in direct contact with the attic, circuits have to be provided to take the conditioned fluid to the rooms in question.

As shown in FIGS. 1, 2, 4 and 7, the panels 11 are positioned adjacent to each other so as to define a roof 10, 110 and in the zones of intersection a connection section 16, 116 is positioned, which can have, as is shown in FIG. 4, an H profile. The segment of section 16, 116 is clamped by screws 27, inserted into the inserts 24 of the external 20 and internal shells 21. In this way the assembly and reciprocal solidity of the whole roof 10 or 110 is guaranteed, which becomes a single self-supporting body. Between one panel 11 and the other there are packings 15 or 115, which represent interface elements with the function of preventing possible infiltrations of water arriving, for example, from rainfall. An external closing element 17 is attached to a block 28, corresponding to a suitable seating on the external shell 20 of the panel 11 in correspondence with each joining zone of the packings 15 or 115, four in this case, to complete the insulation from the external environment and to contribute to connect the panels 11 to each other. The corner closing is improved by the fact that the profile of the block 28 couples with the profile of the interconnection insert 24, which provides an abutment for the block 28.

In the coupling zone of the external 20 and internal 21 shells there are ridges 29, on each of the two contact surfaces, mating, which substantially couple to each other by using suitable gluing or sealing substances which thus allow an airtight and watertight seal of the fluid 40 or other material in the compartment 23 and the mechanical solidity of the panel 11.

Figure 5:
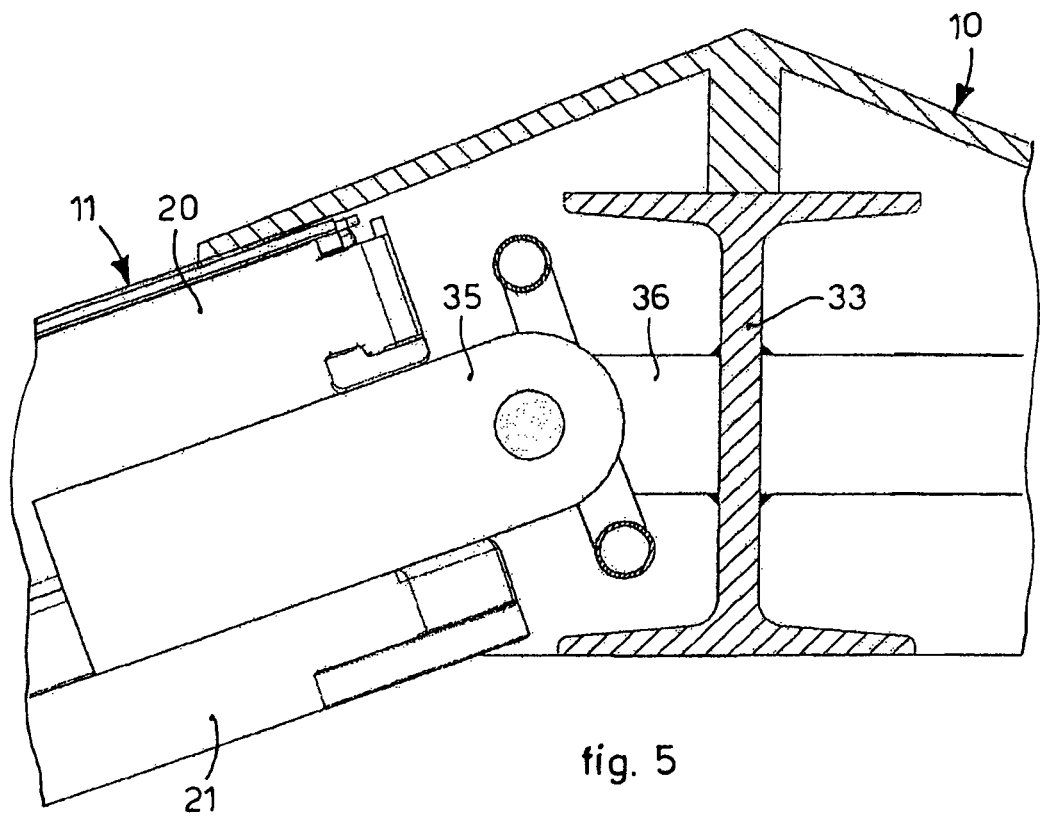
FIG. 5 is a front sectioned view of the ridge of a sloping roof and the relative connections with the modular panels.

In the case of a sloping roof 10, FIG. 5 shows a possible connection between one panel 11 and a vault beam 33 of the roof 10. The vault beam 33 comprises an attachment element 36 welded to it, cooperating with an attachment element 35 of the panel 11.

Figure 6:
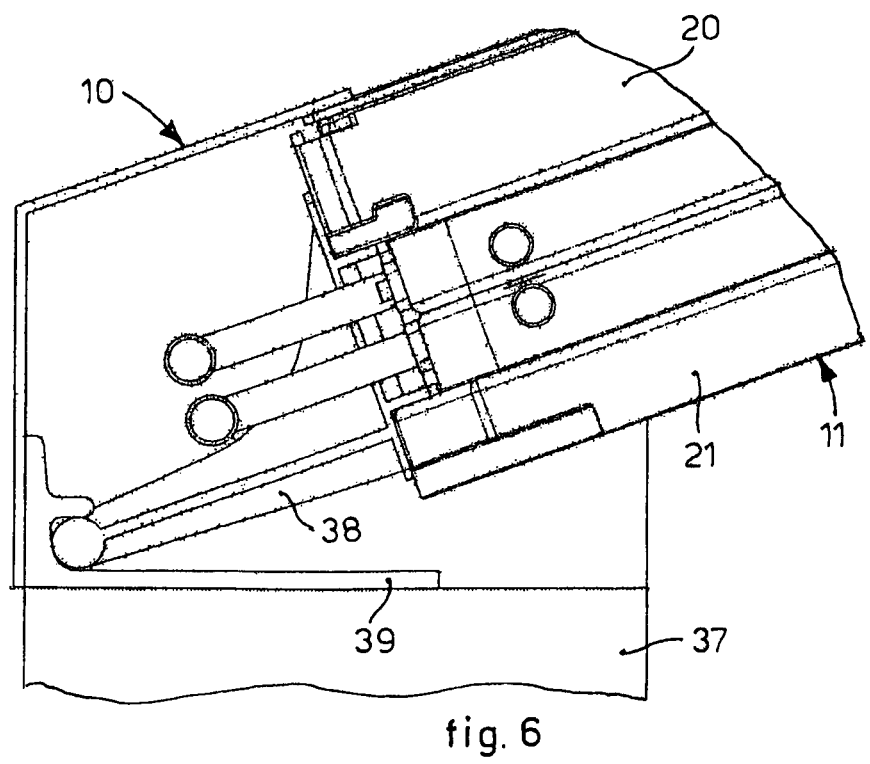
FIG. 6 is a front sectioned view of the lower zone of the roof and the connections between the modular panels and the perimeter structure of the sloping roof.

A possible connection between a panel 11 and the lower zone of the sloping roof 10 is shown in FIG. 6. In this case, a connection element 38 is attached at one end to the panel 11 by means of screws 27 and has the cylindrical opposite end located in a seating made on a section 39 anchored to a bearing wall 37 of the internal environment.

In the case of a vault-type roof 110, the panels 11 used are the same as those used for sloping roofs 10, with the difference that each pair of connected panels 11 achieves a defined arc of curvature, necessary to guarantee overall the desired curvature of the roof 110. Each arc of curvature is made by interposing between the two panels 11 two wedge elements 14, as shown in FIG. 7. A packing 115 is disposed along each side of the panel 11 adjacent to the side of another panel 11 disposed on the roof 110, so as to cover the wedge element 14 and to improve the insulation with the outside. A connection section 116 is inserted into the joining zone between two panels 11, so as to allow the inclined coupling thereof.

It is clear that modifications and/or additions of parts may be made to the modular panels, to the relative roofs or walls made and to the relative method as described heretofore, without departing from the field and scope of the present invention.

It is also clear that, although the present invention has been described with reference to some specific examples, a person of skill in the art shall certainly be able to achieve many other equivalent forms of modular panels, having the characteristics as set forth in the claims and hence all coming within the field of protection defined thereby.

I claim:

1. A modular panel to make a roof or a wall of a building, comprising an external shell and an internal shell, made of moldable plastic material, coupled with each other to define at least a compartment, comprising:
   means for the capturing and irradiation of energy, associated, at least partly, with the external shell, the means for capturing and irradiation of energy comprising a glass panel facing outward and a capturing panel,
   energy accumulation means comprising a heat-carrying fluid, contained in said compartment and having an energy accumulation function,
   a capturing circuit wherein said heat-carrying fluid means flows at least between the modular panel and an adjacent modular panel, and
   a conditioning circuit disposed on the side of the panel facing toward the inside of the building, where the heat-carrying fluid can be heated or cooled, wherein the external shell is made of polyurethane material reinforced with glass or carbon fibers,
   wherein said heat-carrying fluid is at least partly in contact with the capturing panel provided externally on said external shell, and
   wherein the modular panel comprises a panel supporting photovoltaic means for the production of electric energy integrated inside the modular panel and located at least partly in contact with said capturing circuit.

2. The modular panel as in claim 1, wherein said external shell is covered, at least partly, by a thermoplastic film.

3. The modular panel as in claim 1, wherein the modular panel comprises a fire detection sensor and a release valve for extinguishing fires.

4. The modular panel as in claim 1, wherein the compartment, in use, is in a condition of at least partial vacuum.

5. The modular panel as in claim 1, wherein the modular panel comprises lateral interconnection elements for the connection of the modular panel with at least one adjacent modular panel so as to define a substantially self-supporting roof.

6. The modular panel as in claim 1, wherein the external shell and the internal shell comprise a coupling profile with mating ridges, which substantially couple one with the other.

7. A roof or wall of a building made by coupling a modular panel as in claim 1 to a second modular panel as in claim 1, said roof or wall comprising a surface inside the building and a surface outside the building defined by the respective external shell and internal shell of the coupled panels.

8. A method to make roofs or walls of a building comprising: assembling at least two modular panels as claimed in claim 1 with respect to each other by lateral attachment means; connecting adjacent modular panels with a hydraulic connection; and attaching the panels located in proximity with a perimeter of the roof or wall to support elements of the building.

* * * * *